Patented Aug. 31, 1954

2,688,028

UNITED STATES PATENT OFFICE 2,688,028

ARYLAMINO ANTHRAQUINONE DYESTUFFS

Ernst Gutzwiller, Basel, Switzerland, assignor to Sandoz A. G., Basel, Switzerland, a Swiss firm No Drawing. Application March 30, 1951,
Serial No. 218,539

Claims priority, application Switzerland
April 6, 1950

3 Claims. (Cl. 260—374)

The present invention relates to new anthraquinone dyestuffs and represents a further development of the invention described in the U. S. Patent No. 2,315,788.

It has been found that new anthraquinone dyestuffs can be prepared by condensing 2:4:6-triethyl-1-aniline with such 6-chloro- or -bromoanthraquinone derivatives that contain in the 1- and 4-position two groups replaceable by an aromatic amine and in which the 7-position is substituted by hydrogen, chlorine or bromine.

The anthraquinone derivatives which can be used in the present process are for example 6-chloroquinizarine, 6:7-dichloroquinizarine, 1:4:6-trichloroanthraquinone, 1-hydroxy-4-amino-6- or -7-chloro or -bromo- or -6.7-dichloroanthraquinone and the leuco-derivatives of these compounds.

The condensation of the anthraquinone derivatives with the 2:4:6-triethyl-1-aniline is generally carried out in presence of a solvent and a catalyst at temperatures between 50° and 250° C., and in an open or in a closed vessel. As suitable solvents the following ones, or mixtures thereof, can be used: water, methanol, ethanol and other aliphatic alcohols, chlorobenzene, nitrobenzene, dimethylaniline, phenol, glacial acetic acid and the 2:4:6-triethyl-1-aniline itself when it is used in excess.

As catalyst generally boric acid, boron fluoride or finely divided copper powder or copper salts may be used, but it is also possible to carry out the condensation in absence of such a catalyst.

Sometimes it is advantageous to carry out the condensation in an inert atmosphere, for example in nitrogen or carbon dioxide atmosphere, preferably under addition to the reaction mixture of acid binding agents, such as sodium-, potassium- or ammonium-acetate, sodium- or potassium-carbonate or -bicarbonate, soap and the like.

The same dyestuff bases can be obtained by condensing 2:4:6-triethyl-1-bromobenzene with 1:4-diaminoanthraquinone derivatives in which the 6- or/and 7-positions are substituted by chlorine or bromine, in the presence of an acid binding agent and of a catalyst such as copper or/and a copper salt.

In order to prepare water-soluble dyestuffs from the water-insoluble dyestuff bases the latter are sulfonated with sulfuric acid or fuming sulfuric acid of appropriate concentration of $SO_3$ or with chlorosulfonic acid, whereby two sulfonic acid groups are introduced into the molecule.

The dyestuffs prepared according to the present processes are valuable acid dyestuffs dyeing wool and natural silk clear blue shades. They possess an excellent fastness to fulling and exceedingly good neutral dyeing qualities; nevertheless they are well soluble in water. Compared to the dyestuffs described in the British Patent No. 579,519 the good solubility of the new dyestuffs in water is of an absolutely unobvious and unexpected high degree. This good solubility in water, in connection with the high neutral affinity and the outstanding fastness properties, give the new dyestuffs a great technical value.

The following examples, without being limitative, illustrate the present invention, the parts being by weight.

Example 1

30 parts of 6:7-dichloroquinizarine are introduced in 110 parts of 2:4:6-triethyl-1-aniline. 6.5 parts of hydrochloric acid 32% and, in small portions, 4.2 parts of tin powder, 5.5 parts of boric acid and 3.5 parts of boron fluoride dihydrate are added. The mixture is stirred in an inert atmosphere at 100-125° C. under distilling the water split off by the condensation reaction. When the condensation is complete, the mass is poured into 700 parts of hydrochloric acid 10%, boiled up and filtered, washed with hot water and dried. The base thus obtained is dissolved in an organic solvent at a higher temperature, if necessary any leuco base oxidized by air, and crystallized. The 1:4-di-(2':4':6'-triethylanilido) -6:7-dichloroanthraquinone is obtained in dark crystals.

10 parts of the purified base are dissolved in 55 parts of sulfuric acid monohydrate. After addition of 30 parts of oleum 28%, the mass is stirred at 40-50°, until it has become totally water-soluble. Then it is poured into 1000 parts of a common salt solution 6%, filtered, washed and dried. The so obtained dyestuff corresponds to the formula

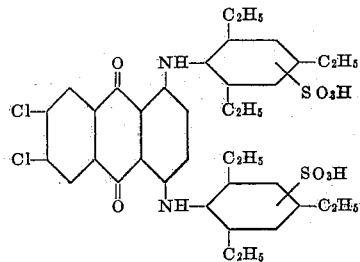

It is well soluble in water, dyes wool and natural silk clear blue shades of an excellent fastness to fulling and possesses a high neutral affinity.

If the 6:7-dichloroquinizarine is replaced by 6:7-dibromoquinizarine, a dyestuff with similar properties will be obtained.

Example 2

20 parts of 1:4-diamino-6:7-dichloroanthraquinone, 50 parts of 2:4:6-triethyl-1-bromobenzene, 50 parts of nitrobenzene, 20 parts of potassium carbonate and 0.5 part of cuprous chloride are stirred at 150-200° C. until the condensation is completed. At 90° C. 100 parts of ethanol are added, then the mass is cooled, filtered, washed with ethanol and water and dried. The base such obtained is purified by crystallization in an organic solvent and sulfonated in weak oleum. A dyestuff will be obtained which is identical to the dyestuff described in Example 1.

Example 3

20 parts of 1:4:6:7-tetrachloroanthraquinone, 20 parts of potassium acetate, 0.3 part of cuprous chloride and 100 parts of 2:4:6-triethyl-1-aniline are stirred at 160–200° C. until the condensation is completed. At 90° C. 100 parts of ethanol are added, then the mass is cooled, filtered and washed with ethanol and water. The condensation product may be purified by crystallization in an organic solvent and is treated with weak oleum. The dyestuff such obtained is identical to the dyestuffs of the Examples 1 and 2.

Example 4

200 parts of 2:4:6-triethyl-1-aniline, 40 parts of glacial acetic acid, 34 parts of leuco-6:7-dichloroquinizarine, 24 parts of 6:7-dichloroquinizarine and 16 parts of boric acid are stirred in an inert atmosphere at 95–105° C. until the condensation is completed. The mass is then poured into a mixture of 200 parts of concentrated hydrochloric acid and 1000 parts of water, stirred for an hour at 70–90° C., filtered, washed with hot water and dried. The base thus obtained is purified by crystallization in an organic solvent, i. e. aniline, and, if necessary, any leuco base is oxidized by air.

The base, 1:4-di-(2':4':6'-triethylanilido)-6:7-dichloroanthraquinone, is sulfonated with weak oleum; the isolated dyestuff is identical to those described in the Examples 1 to 3.

Instead of leuco-6:7-dichloroquinizarine and 6:7-dichloroquinizarine there can be used mixtures of 6:7-dichloroquinizarine and leuco-1:4-diamino-6:7-dichloroanthraquinone or of 1:4-diamino-6:7-dichloroanthraquinone and leuco-1:4-diamino-6:7-dichloroanthraquinone or of 1-amino - 4 - hydroxy - 6:7-dichloroanthraquinone and leuco - 1 - amino-4-hydroxy-6:7-dichloroanthraquinone. The same dyestuff will be obtained in all cases.

Example 5

200 parts of 2:4:6-triethyl-1-aniline, 30 parts of leuco-6-chloroquinizarine, 22 parts of 6-chloroquinizarine, 6 parts of boron fluoride dihydrate and 12 parts of boric acid are stirred in an inert atmosphere at 95–130° C. until the condensation is completed. The base is isolated as described in Example 1 and sulfonated with weak oleum. The so-obtained dyestuff corresponds to the formula

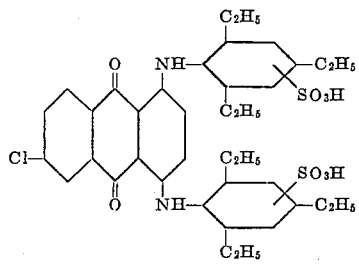

It is well soluble in water, dyes wool and natural silk clear blue shades of an excellent fastness to fulling and possesses a high neutral affinity.

By replacing the 6-chloroquinizarine (or its leuco-derivative) by 6-bromoquinizarine (or its leuco derivative) the respective brominated dyestuff will be obtained which dyes wool similar shades.

Having thus disclosed the invention, what is claimed is:

1. The anthraquinone dyestuffs of the general formula

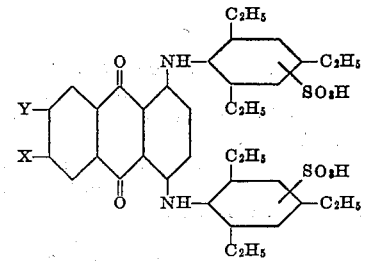

wherein X stands for a member selected from the group consisting of chlorine and bromine, and Y stands for a member selected from the group consisting of hydrogen, chlorine and bromine.

2. The anthraquinone dyestuff of the general formula

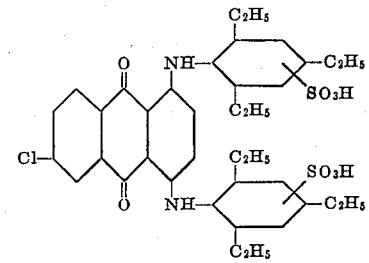

3. The anthraquinone dyestuff of the general formula

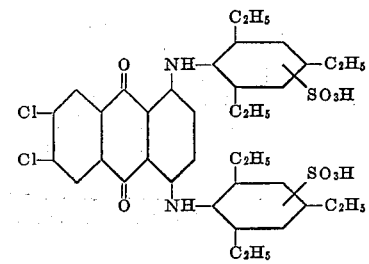

References Cited in the file of this patent

UNITED STATES PATENTS

| Number | Name | Date |
|---|---|---|
| 2,101,094 | Peter | Dec. 7, 1937 |
| 2,121,928 | Peter | June 29, 1938 |
| 2,315,788 | Gutzwiller | Apr. 6, 1943 |

FOREIGN PATENTS

| Number | Country | Date |
|---|---|---|
| 579,519 | Great Britain | Aug. 7, 1946 |